US012633960B2

(12) United States Patent
Khawand et al.

(10) Patent No.: US 12,633,960 B2
(45) Date of Patent: May 19, 2026

(54) SWITCHABLE COMMUNICATION INTERFACE

(71) Applicant: Microsoft Technology Licensing, LLC, Redmond, WA (US)

(72) Inventors: Charbel Khawand, Sammamish, WA (US); Andrew James Hillenius, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 18/329,350

(22) Filed: Jun. 5, 2023

(65) Prior Publication Data

US 2024/0405796 A1      Dec. 5, 2024

(51) Int. Cl.
H04B 5/00        (2024.01)
A61N 1/00        (2006.01)
A61N 1/08        (2006.01)
H04B 1/401        (2015.01)
H04B 5/72        (2024.01)

(52) U.S. Cl.
CPC .............. H04B 1/401 (2013.01); H04B 5/72 (2024.01)

(58) Field of Classification Search
None
See application file for complete search history.

(56) References Cited

U.S. PATENT DOCUMENTS 6,434,429 B1 *   8/2002   Kraus .................. A61B 5/0031
                                                    128/903
7,069,086 B2 *   6/2006   Von Arx ............ A61N 1/37223
                                                    128/903

7,729,776 B2 *   6/2010   Von Arx ............ A61N 1/37223
                                                    607/60
7,787,958 B2 *   8/2010   Stevenson .......... A61N 1/37223
                                                    607/115
8,046,080 B2 *  10/2011   Von Arx ............ A61N 1/37276
                                                    607/60
8,326,424 B2 *  12/2012   Bange ................ A61N 1/37223
                                                    607/32

(Continued)

FOREIGN PATENT DOCUMENTS

CN        112468175 A      3/2021
WO        2016153685 A1    9/2016

OTHER PUBLICATIONS

"TransferJet", Retrieved From: https://en.wikipedia.org/wiki/ TransferJet, Retrieved on Apr. 13, 2023, 4 Pages.

(Continued)

*Primary Examiner* — Tuan A Tran

(74) *Attorney, Agent, or Firm* — Holzer Patel Drennan

(57)        ABSTRACT

A communication device includes a wireless communication controller, a switch, a near field energy coupler configured for wireless communications and communicatively connectable to the wireless communication controller through the switch. The communication device also includes a far field wireless communication antenna configured for wireless communications and communicatively connectable to the wireless communication controller through the switch. The switch is configured to switch communication with the wireless communication controller between the near field energy coupler and the far field wireless communication antenna.

15 Claims, 13 Drawing Sheets

(56) References Cited

U.S. PATENT DOCUMENTS

| | | | | |
|---|---|---|---|---|
| 8,639,339 | B2 * | 1/2014 | Bange ................. | A61N 1/37276 |
| | | | | 607/32 |
| 8,706,251 | B2 * | 4/2014 | Von Arx ............... | H04L 9/3271 |
| | | | | 607/60 |
| 8,766,801 | B2 * | 7/2014 | Rofougaran ............. | H04B 5/22 |
| | | | | 340/568.1 |
| 9,042,816 | B2 * | 5/2015 | Frankland ................ | H04B 5/77 |
| | | | | 455/193.1 |
| 9,049,985 | B2 * | 6/2015 | Feher .................... | H04L 5/1453 |
| 11,116,988 | B2 * | 9/2021 | Maile ................... | A61N 1/3787 |
| 11,529,523 | B2 * | 12/2022 | Balczewski ............ | A61B 5/686 |
| 12,131,607 | B1 * | 10/2024 | Tsutsui ................ | G07F 17/3223 |
| 12,142,809 | B2 * | 11/2024 | Yang ......................... | H01P 1/10 |
| 2014/0152253 | A1 | 6/2014 | Ozaki | |
| 2017/0154484 | A1 * | 6/2017 | Plüss ........................ | H04W 4/80 |
| 2018/0069311 | A1 * | 3/2018 | Pallas ................... | H04W 4/025 |

OTHER PUBLICATIONS

International Search Report and Written Opinion received for PCT Application No. PCT/US2024/030668, mailed on Sep. 13, 2024, 12 pages.
International Preliminary Report on Patentability (Chapter I) received for PCT Application No. PCT/US2024/030668, mailed on Dec. 18, 2025, 07 pages.

* cited by examiner

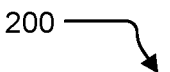
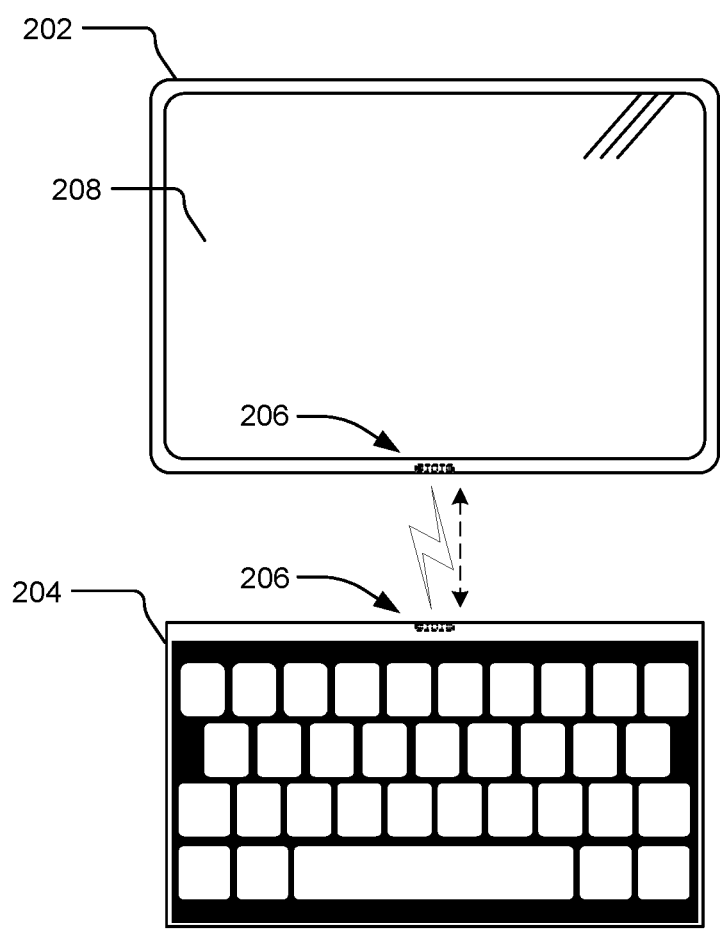
FIG. 2

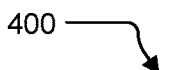
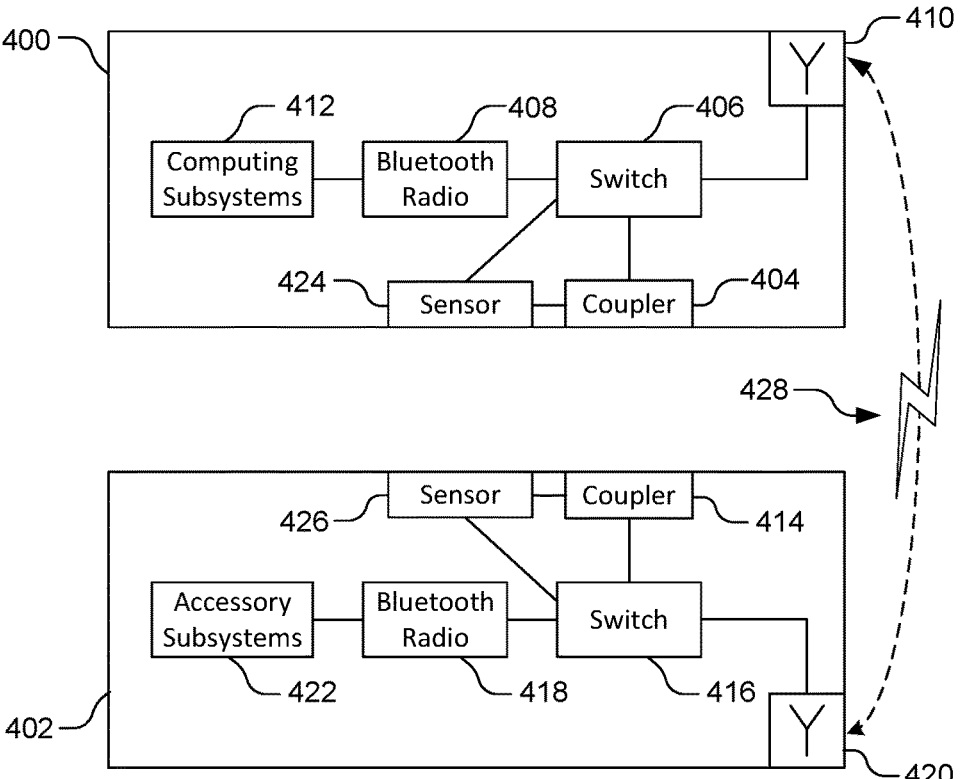
FIG. 4

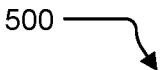
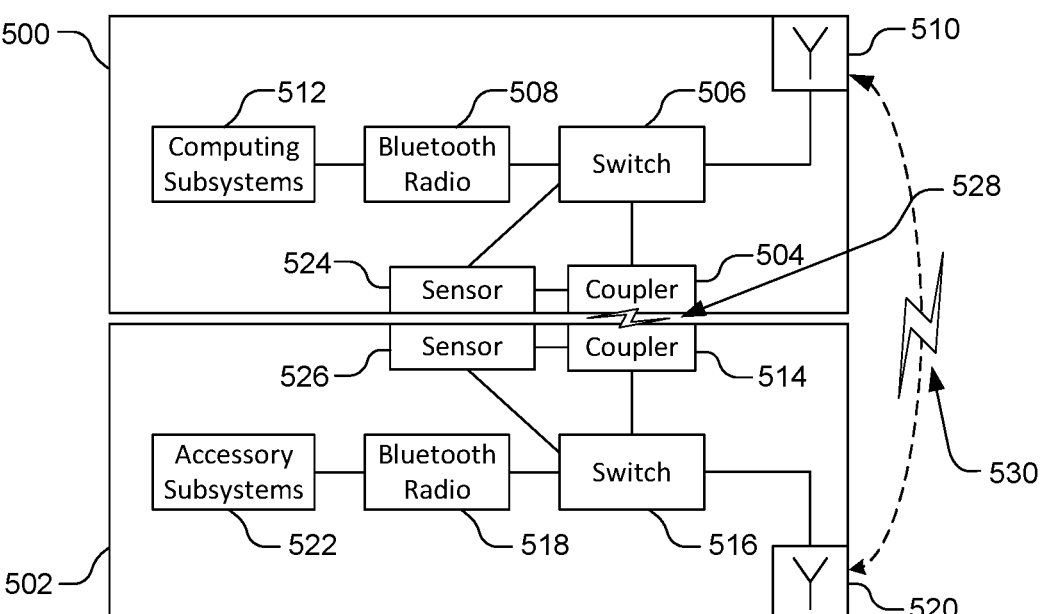
FIG. 5

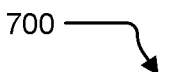
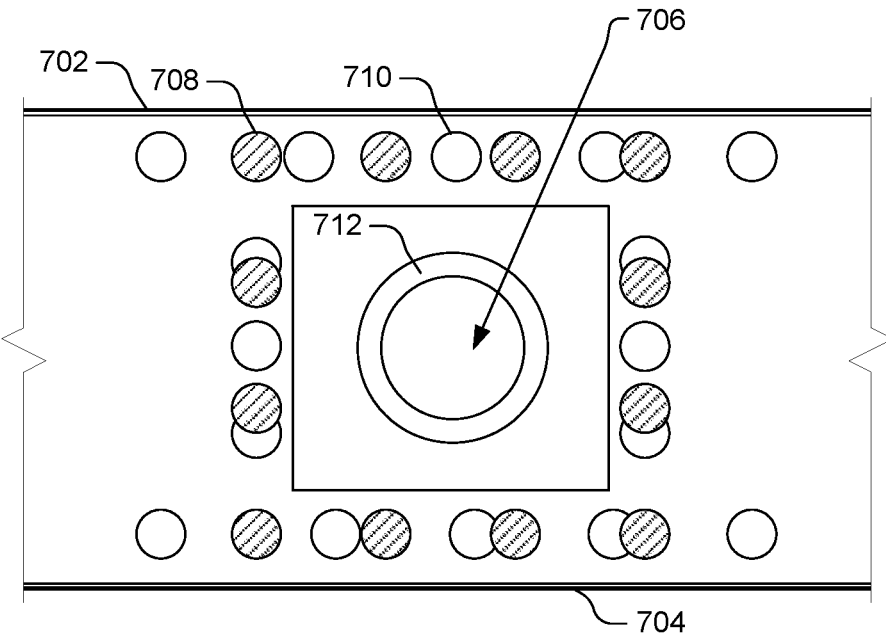
FIG. 7

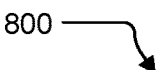
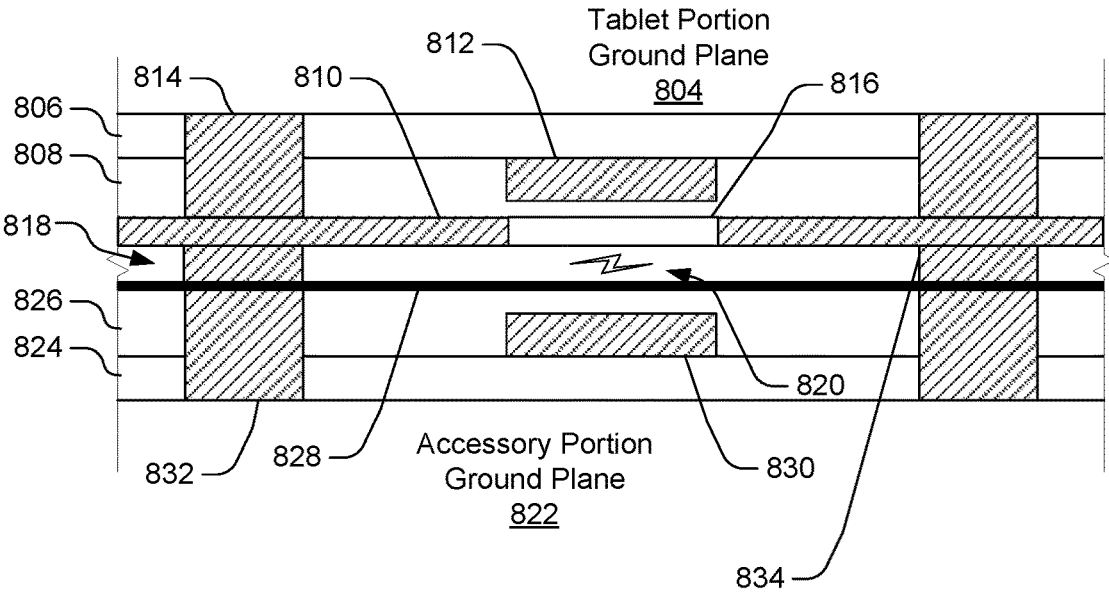
FIG. 8

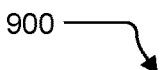
900
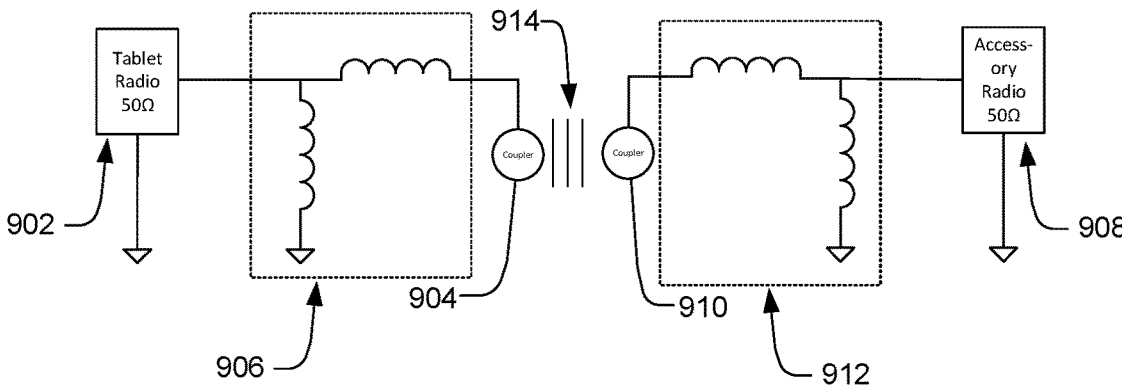
FIG. 9

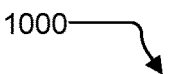
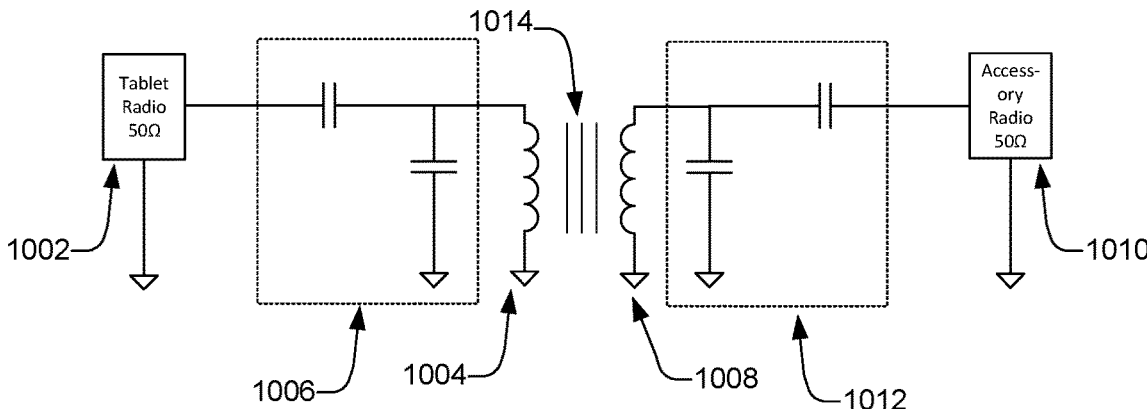
FIG. 10

1100

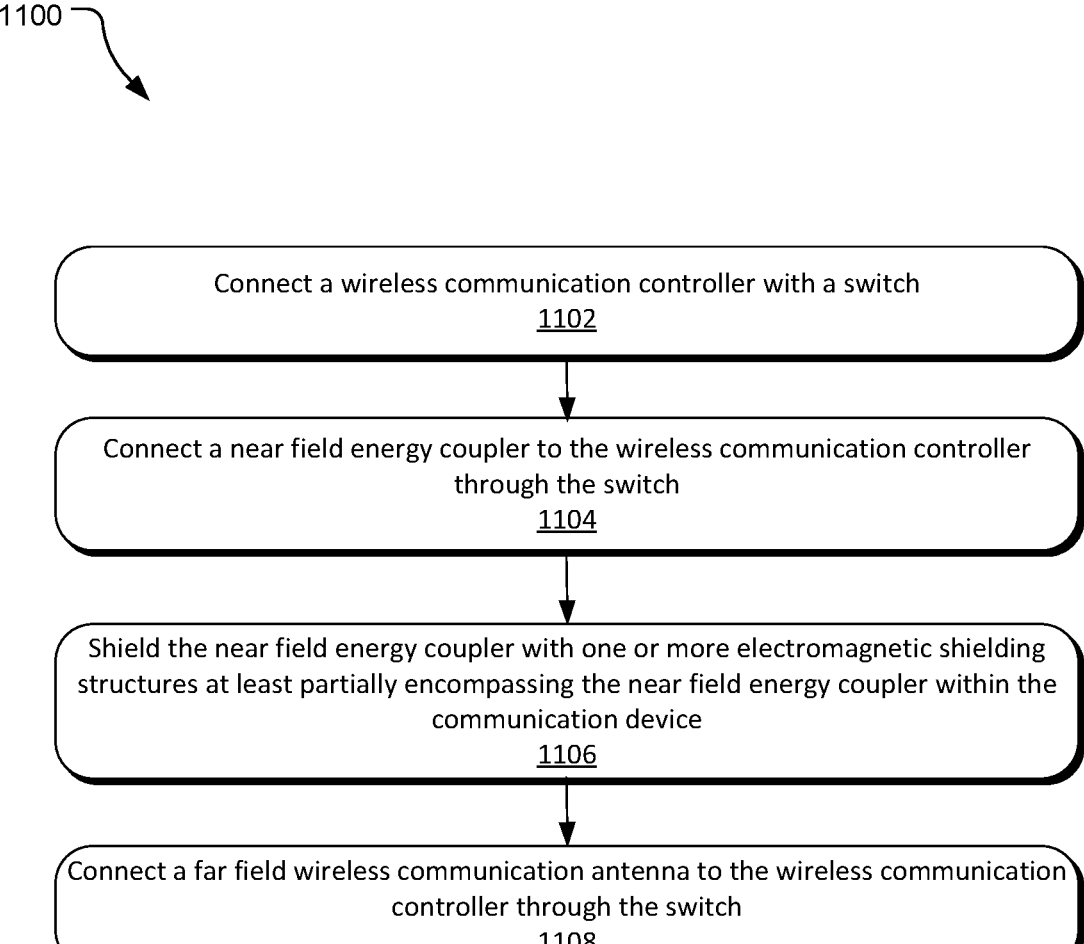

Connect a wireless communication controller with a switch
1102

Connect a near field energy coupler to the wireless communication controller through the switch
1104

Shield the near field energy coupler with one or more electromagnetic shielding structures at least partially encompassing the near field energy coupler within the communication device
1106

Connect a far field wireless communication antenna to the wireless communication controller through the switch
1108

FIG. 11

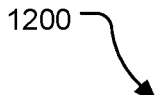

1200

Provide a wireless communication controller, a switch, a near field energy coupler configured for wireless communications and communicatively connectable to the wireless communication controller, a far field wireless communication antenna configured for wireless communications and communicatively connectable to the wireless communication controller
1202

Switch, by the switch, communication with the wireless communication controller between the near field energy coupler and the far field wireless communication antenna
1204

FIG. 12

SWITCHABLE COMMUNICATION INTERFACE

BACKGROUND

ISM stands for industrial, scientific, and medical (ISM) radio bands that contain a group of internationally reserved frequencies designated for radio frequency (RF) communications in the scientific, medical, and industrial fields. However, such spectral bandwidth available for consumer products is inherently limited, introducing risks that large numbers of communications devices using this limited bandwidth can overwhelm the wireless communication link capacity, potentially introducing interference with concurrent communications and degrading communication performance between devices. Furthermore, integrating multiple antennas with sufficient RF isolation for concurrent operation within a communication device (e.g., a mobile phone) can require more space than is available in such a product category.

SUMMARY

In some aspects, the techniques described herein relate to a communication device including: a wireless communication controller; a switch; a near field energy coupler configured for wireless communications and communicatively connectable to the wireless communication controller through the switch; and a far field wireless communication antenna configured for wireless communications and communicatively connectable to the wireless communication controller through the switch, wherein the switch is configured to switch communication with the wireless communication controller between the near field energy coupler and the far field wireless communication antenna.

In some aspects, the techniques described herein relate to a method of manufacturing a communication device, the method including: connecting a wireless communication controller with a switch; connecting a near field energy coupler to the wireless communication controller through the switch, the near field energy coupler being configured for near field wireless communications; shielding the near field energy coupler with one or more electromagnetic shielding structures at least partially encompassing the near field energy coupler within the communication device; and connecting a far field wireless communication antenna to the wireless communication controller through the switch, the far field wireless communication antenna being configured for wireless communications, wherein the switch is configured to switch communication with the wireless communication controller between the near field energy coupler and the far field wireless communication antenna.

In some aspects, the techniques described herein relate to a method of managing communications with a switchable communication interface, the method including: providing a wireless communication controller, a switch, a near field energy coupler configured for wireless communications and communicatively connectable to the wireless communication controller, a far field wireless communication antenna configured for wireless communications and communicatively connectable to the wireless communication controller; and switching, by the switch, communication with the wireless communication controller between the near field energy coupler and the far field wireless communication antenna.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTION OF THE FIGURES

FIG. 2 illustrates an example computing system with a tablet portion and an accessory portion communicating using a far field wireless communication channel via switchable communication interfaces.

FIG. 4 illustrates components of an example switchable communication interface for a tablet portion and an example switchable communication interface for an accessory portion communicating using a far field wireless communication channel.

FIG. 5 illustrates components of an example switchable communication interface for a tablet portion and an example switchable communication interface for an accessory portion communicating using a near field energy coupling channel and a far field wireless communication channel.

FIG. 7 illustrates multiple layers of example near field energy coupler interfaces between a tablet portion and an accessory portion (e.g., a keyboard portion) in a transparent plan view.

FIG. 8 illustrates multiple layers of example near field energy coupler interfaces between a tablet portion (at the top) and an accessory portion (at the bottom) in a side cross-sectional view.

FIG. 9 illustrates an example electric field coupler circuit.

FIG. 10 illustrates an example magnetic field coupler circuit.

FIG. 11 illustrates example operations for manufacturing a switchable communications interface for use in a communication device.

FIG. 12 illustrates example operations for managing communications with a switchable communication interface.

DETAILED DESCRIPTION

The described technology provides a switchable communication interface for a communication device. In an example scenario, "near field" and "far field" refer to regions of the electromagnetic (EM) field around an object, such as a transmitting antenna or coupler. Non-radiative near field behaviors dominate close to the antenna or coupler, whereas radiative far field behaviors dominate at greater distances. Far field electric (E) and magnetic (B) field strengths decrease as the distance from the sources increases, reflected in the inverse-square law for radiated power intensity of electromagnetic radiation. By contrast, near field E and B strengths decrease more rapidly with increased distance: the near radiative field decreases by the inverse-distance squared, the near reactive field by an inverse-cube law, resulting in a diminished power in the parts of the electric field by an inverse fourth-power and sixth-power, respectively. The rapid drop in power contained in the near field ensures that effects due to the near field essentially vanish a few wavelengths away from the radiating part of the antenna or coupler.

Figure 1:
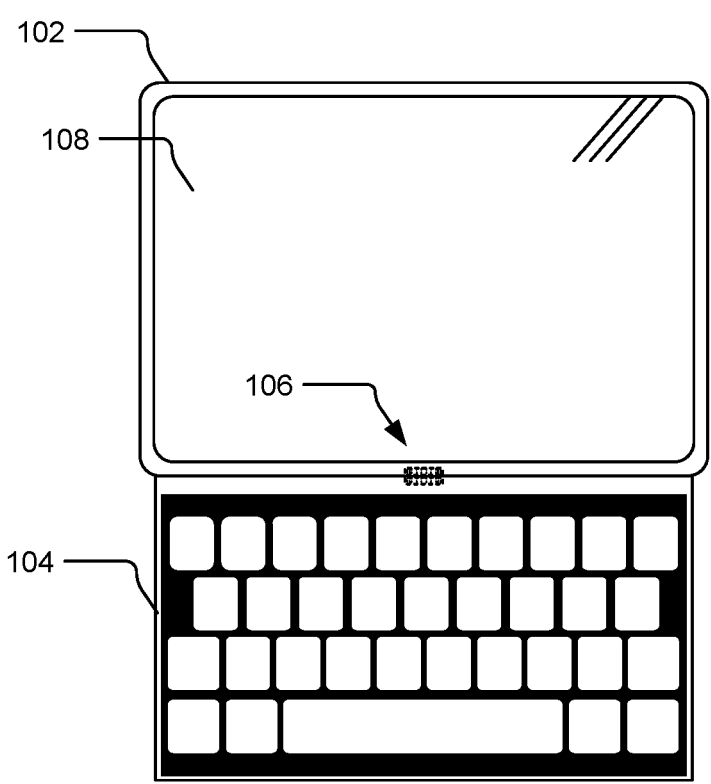
FIG. 1 illustrates an example computing system with a tablet portion and an accessory portion communicating using near field energy coupling through switchable communication interfaces.
Figure 3:
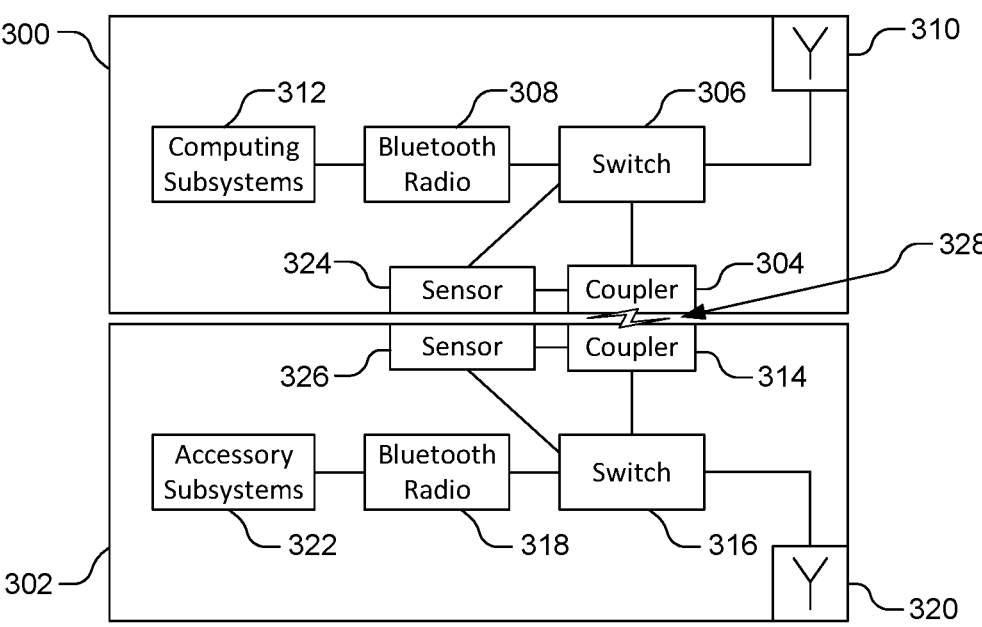
FIG. 3 illustrates components of an example switchable communication interface for a tablet portion and an example switchable communication interface for an accessory portion communicating using a near field energy coupling channel.

FIG. 1 illustrates an example computing system 100 with a tablet portion 102 and an accessory portion 104 (e.g., a keyboard portion) communicating using near field energy coupling through switchable communication interfaces 106. One switchable communication interface is positioned within the tablet portion 102, and another is positioned within the accessory portion 104. In various implementations, a switchable communication interface includes a wireless communication controller, a switch, a near field energy coupler, and a far field wireless communication antenna, wherein the switch can direct communications between the wireless communication controller and one or both of the near field energy coupler and the far field wireless communication antenna. It should be understood that the switch implementations may take various forms, including switches that are external to the radio chips, coupler interfaces, and subsystems (e.g., as shown in FIG. 3) and switching mechanisms that may be an internal part of the radio chip, coupler interfaces, subsystems, or RF front-end chips, such as antenna diversity or MIMO chains.

For example, by communicating between the two portions using the near field energy couplers of both portions, traffic in certain RF channels and RF noise in proximity to the computing system 100 can be reduced. Communications between near field energy couplers are conducted over a near field energy coupling channel (e.g., approximately in the range of 2.4-2.48 GHz, although other frequency bands may be supported). The near field energy coupling channel provides a type of wireless communications channel. In other examples, by communicating between the two portions using both the near field energy couplers and the far field wireless communication antennas of both portions, the available bandwidths of both the near field energy coupling channel and the far field wireless communication channel may be employed, thereby achieving increased throughput, reduced latency, etc. as compared to a single wireless communications channel alone.

Various portions of a computing system can be communicatively connected using the switchable communication interfaces 106, including without limitation pointing devices (e.g., track pads), audio input/output accessory devices (e.g., microphones, speakers), video input/output accessory devices (e.g., cameras, displays), hubs and adapters, and other computing devices. In addition to the switchable communication interface, the tablet portion 102 includes a display panel 108 and other computing device subsystems, such as hardware processors, memory, power supplies, etc. Likewise, in addition to the switchable communication interface, the accessory portion 104 may include a keyboard and other accessory subsystems, such as hardware processors, memory, power supplies, etc., although different types of accessory portions may include a different combination of components.

In the configuration illustrated in FIG. 1, the switchable communication interfaces 106 of the tablet portion 102 and the accessory portion 104 are in very close proximity (e.g., within a few wavelengths of each other). Accordingly, the switchable communication interface of each portion is able to communicate with the other portion using near field energy couplers in the corresponding switchable communication interfaces. In some implementations, the switchable communication interface of each portion is also able to communicate with the other portion using a far field wireless communication channel in the corresponding switchable communication interfaces, such as between far field wireless communication antennas, which can provide multiple wireless communications channels between the two portions and therefore an increased throughput, reduced latency, etc. as compared to a single channel.

FIG. 2 illustrates an example computing system 200 with a tablet portion 202 and an accessory portion 204 (e.g., a keyboard portion) communicating using a far field wireless communication channel via switchable communication interfaces 206. One switchable communication interface is positioned within the tablet portion 202, and another is positioned within the accessory portion 204. In various implementations, a switchable communication interface includes a wireless communication controller, a switch, a near field energy coupler, and a far field wireless communication antenna, wherein the switch can direct communications between the wireless communication controller and the far field wireless communication antenna. For example, by communicating between the two portions using the far field wireless communication antennas of both portions, communication can be maintained even if the tablet portion 202 and the accessory portion 204 are not in close enough proximity (e.g., within a few wavelengths). Wireless communications between far field wireless communication antennas are conducted over a far field wireless communication channel (e.g., at Bluetooth frequencies).

Various portions of a computing system can be communicatively connected using the switchable communication interfaces 206, including without limitation pointing devices (e.g., track pads), audio input/output accessory devices (e.g., microphones, speakers), video input/output accessory devices (e.g., cameras, displays), hubs and adapters, and other computing devices. In addition to the switchable communication interface, the tablet portion 202 includes a display panel 208 and other computing device subsystems, such as hardware processors, memory, power supplies, etc. Likewise, in addition to the switchable communication interface, the accessory portion 204 may include a keyboard and other accessory subsystems, such as hardware processors, memory, power supplies, etc., although different types of accessory portions may include a different combination of components.

In the configuration illustrated in FIG. 2, the switchable communication interfaces 206 of the tablet portion 202 and the accessory portion 204 are not in very close proximity (e.g., not within a few wavelengths of each other). Accordingly, the switchable communication interface of each portion is able to communicate with the other portion using the far field wireless communication antennas, but not the near field energy couplers, in the corresponding switchable communication interfaces.

FIG. 3 illustrates components of an example switchable communication interface 300 for a tablet portion and an example switchable communication interface 302 for an accessory portion communicating using a near field energy coupling channel 328. The switchable communication interface 300 includes a near field energy coupler 304, a switch 306, Bluetooth radio circuitry 308 (e.g., an example wireless communication controller), a Bluetooth antenna 310 (e.g., an example far field wireless communication antenna). In most implementations, the Bluetooth radio circuitry 308 includes board-level components that can communicate in the 2.4 GHz industrial, scientific, and medical (ISM) radio band. Bluetooth is a registered trademark of the Bluetooth Special Interest Group (SIG), a trade association of electronics manufacturers that promotes Bluetooth technology and ensures compliance. Bluetooth was designed to replace short-range cable protocols but has expanded into short-range networking. Devices that contain Bluetooth chips communicate via a standard radio frequency instead of through wires, cables, or direct user action. Newly manufactured devices are Bluetooth SIG 1.2 compliant and are compatible with products that use Bluetooth versions 1.0, 1.0b, and 1.1, although additional advances are contemplated. The Bluetooth radio circuitry 308 is communicatively coupled to computing subsystems 312 of the switchable communication interface 300.

The switchable communication interface 302 also includes a near field energy coupler 314, a switch 316, Bluetooth radio circuitry 318 (e.g., an example wireless communication controller), and a Bluetooth antenna 320 (e.g., an example far field wireless communication antenna). The Bluetooth radio circuitry 318 is communicatively coupled to accessory subsystems 322 of the switchable communication interface 302.

In the illustrated implementation, the switchable communication interface 300 includes a coupling detector (e.g., a sensor 324), and the switchable communication interface 302 includes a coupling detector (e.g., a sensor 326). The sensors may be in the form of Hall Effect sensors or some kind of other sensors capable of sensing the proximity of one interface to the other. In the case of the near field energy coupling channel, the near field energy coupler 304 and the near field energy coupler 314 provide effective communication at up to a distance of about several wavelengths of the RF communication signal. Accordingly, the sensors detect that the counterpart interfaces are in such close proximity and notify their corresponding switches to communicatively connect their Bluetooth radios to their corresponding near field energy couplers. In this manner, the switchable communication interface 300 and the switchable communication interface 302 can communicate over a high speed near field energy coupling channel that is isolated from other communications in the ISM radiofrequency bands in the proximity. The interference risks can be further reduced by incorporating EM shielding structures into or around (e.g., at least partially encompassing one or more of the near field energy couplers.

The Bluetooth radio circuitry 308 connects through the switch 306 with the near field energy coupler 304 and/or the Bluetooth antenna 310, depending on the switch state. In the illustrated switch state, the switch 306 communicatively connects the Bluetooth radio circuitry 308 with the near field energy coupler 304 so that the switchable communication interface 300 can communicate via the near field energy coupling channel 328 with the switchable communication interface 302.

In various implementations, the near field energy couplers may be in the form of electrically small electric or magnetic field couplers for minimally radiative communication between the switchable communication interface 300 and the switchable communication interface 302. The couplers act as independent paths for Bluetooth communications when the interfaces are attached or constrained in close proximity, such as with a magnetically attached keyboard, case, or dock. The near field energy coupling channel 328 can integrate into existing Bluetooth diversity antenna selection algorithms and can be activated via the switches when attached or in close proximity, whereas the radiative path of the far field wireless communication channel is activated when the interfaces are detached or physically separated. The near field energy coupling channel 328 can provide various technical benefits, including without limitation:

a very small radiating element and metal clearance area relative to the communication wavelength and far field radiator requirements high isolation to radiative Bluetooth and Wi-Fi antennas in the so-equipped tablet computers, accessories, etc., as well as high isolation to environmental wireless traffic very low coupled power loss, allowing for very low communication power, as much as 40 dB lower than a link with two radiating antennas, such as in a tablet and keyboard accessory The switchable communication interface 302 adjusts its operation in a similar manner as described with respect to the switchable communication interface 300. Furthermore, in some implementations, only one of the interfaces includes such a sensor. That sensor can then inform the other interface that near field coupling communications are available. For example, the sensor 324 in the switchable communication interface 300 can detect the proximity of the switchable communication interface 302 (e.g., using a capacitive sensor) and attempt to negotiate the use of near field coupling communications with the switchable communication interface 302. If the switchable communication interface 302 acknowledges that near field coupling communications are to be used, both the switchable communication interface 300 and the switchable communication interface 302 proceed with near field coupling communications until the proximity detection is lost. If the switchable communication interface 300 does not receive an acknowledgment of near field coupling communications, then it may attempt to communicate using other means, such as the Bluetooth antenna 310 (e.g., the sensor 324 instructs the switch 306 to communicatively connect the Bluetooth radio circuitry 308 to the Bluetooth antenna 310).

FIG. 4 illustrates components of an example switchable communication interface 400 for a tablet portion and an example switchable communication interface 402 for an accessory portion communicating using a far field wireless communication channel 428. The switchable communication interface 400 includes a near field energy coupler 404, a switch 406, Bluetooth radio circuitry 408 (e.g., an example wireless communication controller), a Bluetooth antenna 410 (e.g., an example far field wireless communication antenna). The Bluetooth radio circuitry 408 is communicatively coupled to computing subsystems 412 of the switchable communication interface 400.

The switchable communication interface 402 also includes a near field energy coupler 414, a switch 416, Bluetooth radio circuitry 418 (e.g., an example wireless communication controller), a Bluetooth antenna 420 (e.g., an example far field wireless communication antenna). The Bluetooth radio circuitry 418 is communicatively coupled to accessory subsystems 422 of the switchable communication interface 402.

In the illustrated implementation, the switchable communication interface 400 includes a coupling detector (e.g., a sensor 424), and the switchable communication interface 402 includes a coupling detector (e.g., a sensor 426). The sensors may be in the form of Hall Effect Sensors or some kind of other sensors capable of sensing the proximity of one interface to the other. In the case of far field communications, the Bluetooth antenna 410 and Bluetooth antenna 420 provide effective communication at up to a distance of about 100 meters in Class 1, or less for Class 2 and Class 3, although these distances may increase (or decrease) as the technology and regulations change.

Accordingly, if the sensors do not detect that the counterpart interfaces are in close enough proximity to provide effective near field communication coupling, the sensors can notify their corresponding switches to communicatively connect their Bluetooth radios to their corresponding far field wireless communication antennas. In this manner, in the absence of attachment or close proximity between the interfaces, the switchable communication interface 400 and the switchable communication interface 402 can communicate over a high speed far field wireless communication channel.

The Bluetooth radio circuitry 408 connects through the switch 406 with the near field energy coupler 404 and/or the Bluetooth antenna 410, depending on the switch state. In the illustrated switch state, the switch 406 communicatively connects the Bluetooth radio circuitry 408 with the Bluetooth antenna 410 so that the switchable communication interface 400 can communicate via the far field wireless communication channel 428 with the switchable communication interface 402.

The switchable communication interface 402 adjusts its operation in a similar manner as described with respect to the switchable communication interface 400. Furthermore, as described with respect to FIG. 3, in some implementations, only one of the interfaces includes such a sensor. That interface then informs the other interface whether near field coupling communications are available.

FIG. 5 illustrates components of an example switchable communication interface 500 for a tablet portion and an example switchable communication interface 502 for an accessory portion communicating using a near field energy coupling channel 528 and a far field wireless communication channel 530. The switchable communication interface 500 includes a near field energy coupler 504, a switch 506, Bluetooth radio circuitry 508 (e.g., an example wireless communication controller), and a Bluetooth antenna 510 (e.g., an example far field wireless communication antenna). The Bluetooth radio circuitry 508 is communicatively coupled to computing subsystems 512 of the switchable communication interface 500.

The switchable communication interface 502 also includes a near field energy coupler 514, a switch 516, Bluetooth radio circuitry 518 (e.g., an example wireless communication controller), and a Bluetooth antenna 520 (e.g., an example far field wireless communication antenna). The Bluetooth radio circuitry 518 is communicatively coupled to accessory subsystems 522 of the switchable communication interface 502.

In the illustrated implementation, the switchable communication interface 500 includes a coupling detector (e.g., a sensor 524), and the switchable communication interface 502 includes a coupling detector (e.g., a sensor 526). The sensors may be in the form of Hall Effect Sensors or some kind of other sensors capable of sensing the proximity of one interface to the other. In the case of the near field energy coupling channel 528, the near field energy coupler 504 and the near field energy coupler 514 provide effective communication at up to a distance of about several wavelengths of the RF communication signal. In the case of the far field wireless communication channel 530, the Bluetooth antenna 510 and Bluetooth antenna 520 provide effective communication at up to a distance of about 100 meters in Class 1, or less for Class 2 and Class 3, although these distances may increase (or decrease) as the technology and regulations change.

Accordingly, if the sensors detect that the counterpart interfaces are in close enough proximity to provide effective near field communication coupling, the sensors can notify their corresponding switches to communicatively connect their Bluetooth radios to their corresponding near field energy couplers. In this manner, in the presence of attachment or close proximity between the interfaces, the switchable communication interface 500 and the switchable communication interface 502 can communicate over a high speed near field energy coupling channel. Furthermore, as illustrated, the switches may also communicatively connect their Bluetooth radios to their corresponding far field wireless communication antennas, thereby providing two communication channels (e.g., both the near field energy coupling channel and the far field wireless communication channel) and higher throughput than available by using a single channel. The use of multiple communication channels may be configurable and/or depending on detected characteristics of the systems (e.g., power availability, RF congestion in the ISM radiofrequency bands, communication speed requirements).

The Bluetooth radio circuitry 508 connects through the switch 506 with the near field energy coupler 504 and/or the Bluetooth antenna 510, depending on the switch state and, optionally, configuration parameters. In the illustrated switch state, the switch 506 communicatively connects the Bluetooth radio circuitry 508 with the near field energy coupler 504 and the Bluetooth antenna 510 so that the switchable communication interface 500 can communicate via the near field energy coupling channel 528 and the far field wireless communication channel 530 with the switchable communication interface 502.

The switchable communication interface 502 adjusts its operation in a similar manner as described with respect to the switchable communication interface 500. Furthermore, as described with respect to FIGS. 3 and 4, in some implementations, only one of the interfaces includes such a sensor and then informs the other interface whether near field coupling communications are available.

Figure 6:
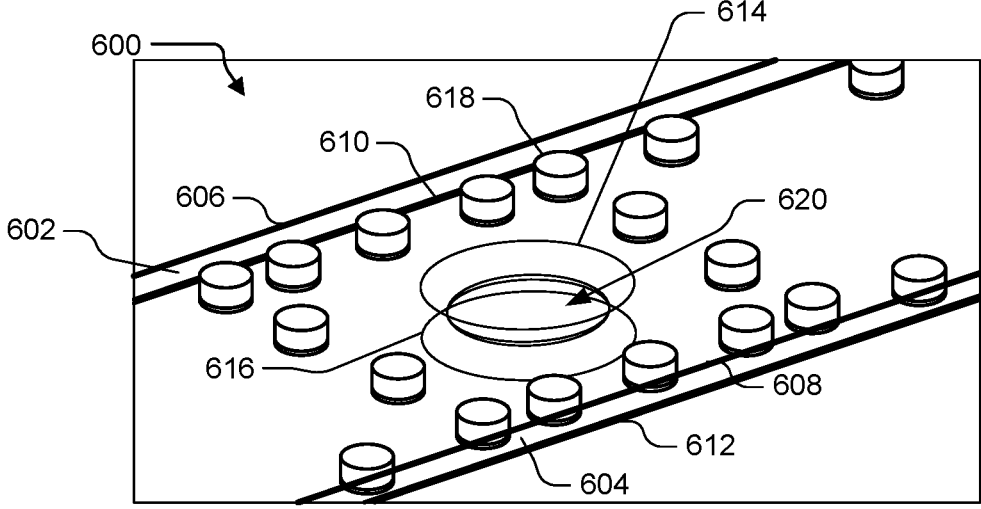
FIG. 6 illustrates multiple layers of example near field energy coupler interfaces between a tablet portion and an accessory portion (e.g., a keyboard portion) in a transparent perspective view.

FIG. 6 illustrates multiple layers of example near field energy coupler interfaces 600 between a tablet portion 602 and an accessory portion 604 (e.g., a keyboard portion) in a transparent perspective view. The lateral bounds of the near field energy coupler interface of the tablet portion 602 are shown at bold edge 606 and bold edge 608, with the coupler structure shown as near field coupler 614. The lateral bounds of the near field energy coupler interface of the accessory portion 604 are shown at bold edge 610 and bold edge 612, with the coupler structure shown as near field coupler 616. The near field couplers are shown in close enough proximity (e.g., a few wavelengths of the RF communication signal) to provide effective communications via near field energy coupling across an air gap between the near field coupler 614 and the near field coupler 616. In one implementation, the near field energy coupler interface of the tablet portion 602 includes an aperture 620 in a metal chassis of the tablet portion 602 (which is typically filled with a dielectric), although, in some implementations, either, both, or neither of the interfaces may include an aperture. Each near field coupler is electrically connected to other circuitry in the corresponding interface.

The coupling energy for near field energy coupling communications may be provided via mutual electric field coupling structures (e.g., an antenna configured to capacitively couple with its counterpart in the other interface) and/or magnetic field coupling structures (e.g., an antenna configured to inductively coupled with its counterpart in the other interface). The couplers may employ beam forming/steering to enhance signal strength while limiting EM interference outside of the proximity of the couplers.

Furthermore, the couplers may include EM shielding structures, such as the conductive (e.g., copper) shielding post 618. In various implementations, the shielding structures may be positioned on one or both sides of the coupler-coupler interface (e.g., see, e.g., FIG. 8). The shielding structures can isolate the EM fields of the couplers to the close proximity of the couplers, reducing or eliminating risks of interference to RF communications of other devices and components in the environment.

FIG. 7 illustrates multiple layers of example near field energy coupler interfaces 700 between a tablet portion and an accessory portion (e.g., a keyboard portion) in a transparent plan view. One interface is positioned above and overlapping the other. The lateral bounds of the near field energy coupler interfaces of the tablet portion (see, e.g., a near field coupler 712) and the accessory portion (obscured by the near field coupler 712) are shown at bold edge 702 and bold edge 704. The couplers are positioned in close enough proximity (e.g., a few wavelengths of the RF communication signal) to provide effective communications via near field energy coupling through one or more apertures (e.g., apertures 706 in the tablet interface) in the respective near field couplers, although, in some implementations, one or both of the couplers need not include an aperture.

The couplers include EM shielding structures, such as the conductive (e.g., copper) shielding post 708 positioned within the tablet portion and conductive shielding post 710 within the accessory portion. In various implementations, the shielding structures may be positioned on one or both sides of the coupler-coupler interface (e.g., see, e.g., FIG. 8). The shielding structures can isolate the EM fields of the couplers to the close proximity of the couplers, reducing or eliminating risks of interference to RF communications of other devices and components in the environment.

FIG. 8 illustrates multiple layers of example near field energy coupler interfaces 800 between a tablet portion (at the top) and an accessory portion (at the bottom) in a side cross-sectional view. The tablet portion includes a stack of layers including a tablet portion ground plane 804, a dielectric gap layer 806, additional dielectric material 808, and a metal device chassis layer 810. In addition, the interface for the tablet portion includes a near field coupler 812 (e.g., electric or magnetic) and EM shielding structures (e.g., shielding structure 814). A dielectric-filled aperture 816 is positioned through the metal device chassis layer 810 to be aligned with the near field coupling interface in the accessory portion, as shown in FIG. 8. One or more of the EM shielding structures may be grounded. Communications signals can be transmitted and received across an air gap 818 in a near field energy coupling channel 820 between the interfaces 800 when they are in close proximity.

The accessory portion (at the bottom) includes a stack of layers including an accessory portion ground plane 822, a dielectric gap layer 824, additional dielectric material 826, and an encasement 828, which is typically manufactured from a dielectric material. If the encasement 828 is metallic, then the encasement 828 may include an aperture (not shown) configured to be positioned opposite the near field coupling interface in the accessory portion. In addition, the interface for the accessory portion include a near field coupler 830 (e.g., electric or magnetic) and EM shielding structures (e.g., shielding structure 832). One or more of the EM shielding structures may be grounded. Communications signals can be transmitted and received across the air gap 818 in the near field energy coupling channel 820 between the interfaces 800 when they are in close proximity.

In the illustrated implementation, one or both interfaces include one or more additional shielding structures (e.g., shielding conductor 834) within the air gap 818 to enhance the EM shielding in this region when the interfaces are brought together. The one or more additional shielding conductors may be electrically grounded. Other implementations need not include such additional shielding conductors.

FIG. 9 illustrates an example electric field coupler circuit 900. A tablet radio system 902 of a tablet portion is electrically connected to an electric field coupler 904 through a matching circuit 906. An accessory radio system 908 of an accessory portion is electrically connected to an electric field coupler 910 through a matching circuit 912. Accordingly, when the couplers of the two portions are in close proximity, the couplers can communicate via mutual capacitance 914 between them (e.g., a capacitive coupling effect).

FIG. 10 illustrates an example magnetic field coupler circuit 1000. A tablet radio system 1002 of a tablet portion is electrically connected to a magnetic field coupler 1004 through a matching circuit 1006. An accessory radio system 1008 of an accessory portion is electrically connected to a magnetic field coupler 1010 through a matching circuit 1012. Accordingly, when the couplers of the two portions are in close proximity, the couplers can communicate via mutual inductance 1014 between them (e.g., an inductive coupling effect).

FIG. 11 illustrates example operations 1100 for manufacturing a switchable communications interface for use in a communication device. A connecting operation 1102 connects a wireless communication controller with a switch. Another connecting operation 1104 connects a near field energy coupler to the wireless communication controller through the switch. The near field energy coupler the configured for wireless communications. A shielding operation 1106 shields the near field energy coupler with one or more electromagnetic shielding structures at least partially encompassing the near field energy coupler within the communication device.

Another connection operation 1108 connects a far field wireless communication antenna to the wireless communication controller through the switch. The far field wireless communication antenna is configured for wireless communications. The switch is configured to switch communication with the wireless communication controller between the near field energy coupler and the far field wireless communication antenna. In one switch state, the switch is configured to connect communication between the wireless communication controller and the near field energy coupler to enable coupled communication capabilities between the near field energy coupler and an external near field energy coupler outside the communication device. In another switch state, the switch is configured to connect communication between the wireless communication controller and the far field wireless communication antenna to enable radiative communication capabilities between the far field wireless communication antenna and an external far field wireless communication antenna outside the communication device. In yet another switch state, the switch is configured to concurrently connect communication between the wireless communication controller and the near field energy coupler and between the wireless communication controller and the far field wireless communication antenna to enable coupled communication capabilities between the near field energy coupler and another external near field energy coupler in another communication device outside the communication device and to enable radiative communication capabilities between the far field wireless communication antenna and an external far field wireless communication antenna in the other communication device outside the communication device.

Another connecting operation (not shown) connects (directly or indirectly) a coupling detector to the switch within the communication device. The coupling detector is configured to detect an external near field energy coupler outside the communication device and to inform the switch of coupled communication capabilities between the near field energy coupler and the external near field energy coupler outside the communication device.

FIG. 12 illustrates example operations 1200 for managing communications with a switchable communication interface. A providing operation 1202 provides a wireless communication controller, a switch, a near field energy coupler configured for wireless communications and communicatively connectable to the wireless communication controller, a far field wireless communication antenna configured for wireless communications and communicatively connectable to the wireless communication controller. A switching operation 1204 switches, by the switch, communication with the wireless communication controller between the near field energy coupler and the far field wireless communication antenna.

In some switch states, the switch connects communication between the wireless communication controller and the near field energy coupler to enable coupled communication capabilities between the near field energy coupler and an external near field energy coupler outside the communication device. In some switch states, the switch connects communication between the wireless communication controller and the far field wireless communication antenna to enable radiative communication capabilities between the far field wireless communication antenna and an external far field wireless communication antenna outside the communication device. In some switch states, the switch concurrently connects communication between the wireless communication controller and the near field energy coupler and between the wireless communication controller and the far field wireless communication antenna to enable coupled communication capabilities between the near field energy coupler and another external near field energy coupler in another communication device outside the communication device and to enable radiative communication capabilities between the far field wireless communication antenna and an external far field wireless communication antenna in the other communication device outside the communication device.

In some implementations, a detecting operation (not shown) detects an external near field energy coupler outside the communication device using a coupling detector communicatively connected to the switch within the communication device. In some implementations, a notifying operation (not shown) informs the switch of coupled communication capabilities detected by the coupling detector between the near field energy coupler and the external near field energy coupler outside the communication device. In some implementations, a shielding operation (not shown) shields the near field energy coupler with one or more electromagnetic shielding structures at least partially encompassing the near field energy coupler within the communication device.

Figure 13:
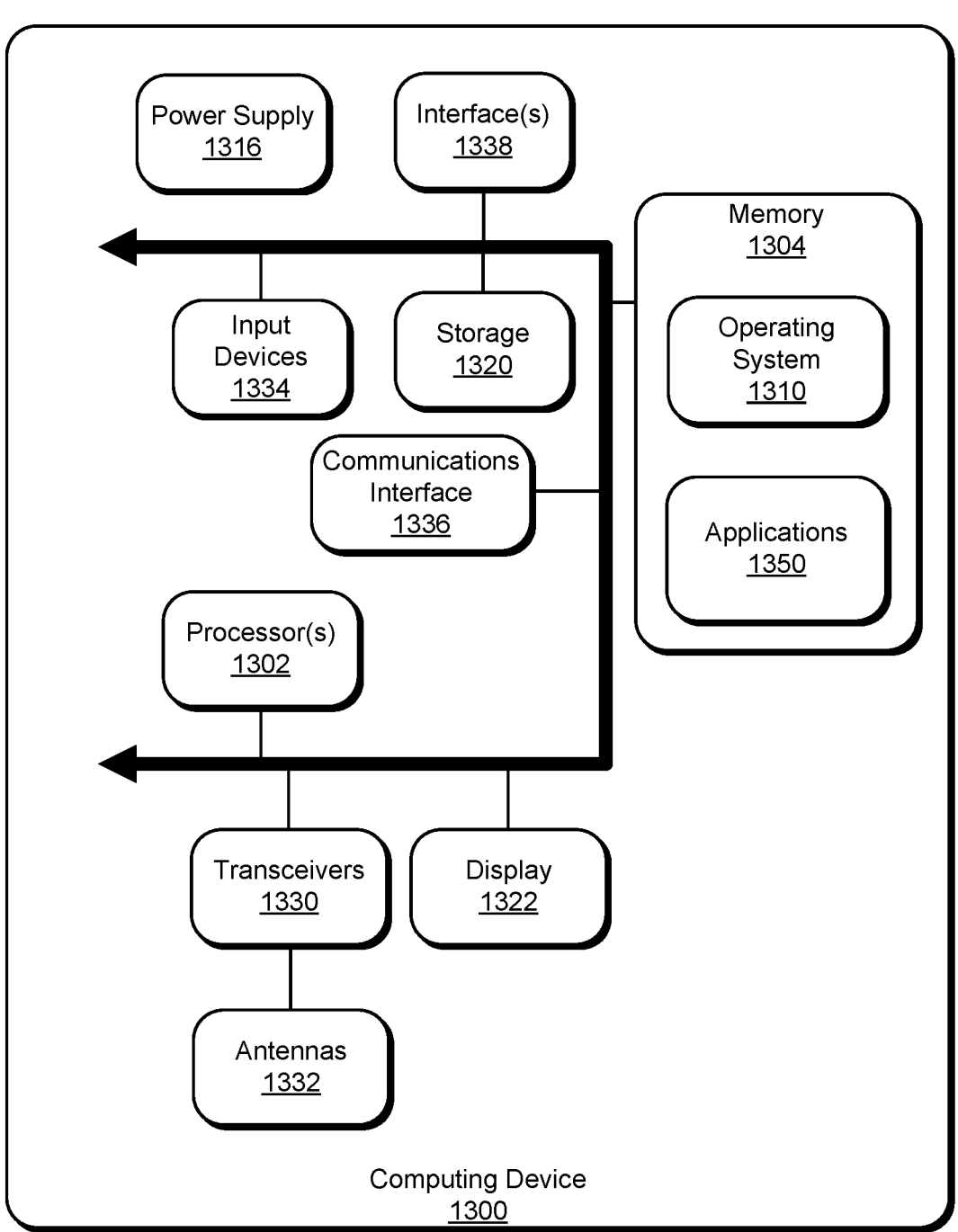
FIG. 13 illustrates an example computing device for use in implementing the described technology.

FIG. 13 illustrates an example computing device 1300 for use in implementing the described technology. The computing device 1300 may be a client computing device (such as a laptop computer, a desktop computer, or a tablet computer), a server/cloud computing device, an Internet-of-Things (IoT), any other type of computing device, or a combination of these options. The computing device 1300 includes one or more processor(s) 1302 and a memory 1304. The memory 1304 generally includes both volatile memory (e.g., RAM) and nonvolatile memory (e.g., flash memory), although one or the other type of memory may be omitted. An operating system 1310 resides in the memory 1304 and is executed by the processor(s) 1302. In some implementations, the computing device 1300 includes and/or is communicatively connected to storage 1320.

In the example computing device 1300, as shown in FIG. 13, one or more modules or segments, such as applications 1350, computing subsystems, accessory subsystems, wireless communications controllers, switches, sensors, and couplers may include or interact with program code and modules that are loaded into the operating system 1310 on the memory 1304 and/or the storage 1320 and executed by the processor(s) 1302. The storage 1320 may store switch states, communication parameters, and other data and be local to the computing device 1300 or may be remote and communicatively connected to the computing device 1300. In particular, in one implementation, components of a system providing a switchable communication interface may be implemented entirely in hardware or in a combination of hardware circuitry and software.

The computing device 1300 includes a power supply 1316, which may include or be connected to one or more batteries or other power sources, and which provides power to other components of the computing device 1300. The power supply 1316 may also be connected to an external power source that overrides or recharges the built-in batteries or other power sources.

The computing device 1300 may include one or more communication transceivers 1330, which may be connected to one or more antenna(s) 1332 to provide network connectivity (e.g., mobile phone network, Wi-Fi®, Bluetooth®) to one or more other servers, client devices, IoT devices, and other computing and communications devices. The computing device 1300 may further include a communications interface 1336 (such as a network adapter or an I/O port, which are types of communication devices). The computing device 1300 may use the adapter and any other types of communication devices for establishing connections over a wide-area network (WAN) or local-area network (LAN). It should be appreciated that the network connections shown are exemplary and that other communications devices and means for establishing a communications link between the computing device 1300 and other devices may be used.

The computing device 1300 may include one or more input devices 1334 such that a user may enter commands and information (e.g., a keyboard, trackpad, or mouse). These and other input devices may be coupled to the server by one or more interfaces 1338, such as a serial port interface, parallel port, or universal serial bus (USB). The computing device 1300 may further include a display 1322, such as a touchscreen display.

The computing device 1300 may include a variety of tangible processor-readable storage media and intangible processor-readable communication signals. Tangible processor-readable storage can be embodied by any available media that can be accessed by the computing device 1300 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 1300. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A communication device comprising: a wireless communication controller; a switch; a near field energy coupler configured for wireless communications and communicatively connectable to the wireless communication controller through the switch; and a far field wireless communication antenna configured for wireless communications and communicatively connectable to the wireless communication controller through the switch, wherein the switch is configured to switch communication with the wireless communication controller between the near field energy coupler and the far field wireless communication antenna.

Clause 2. The communication device of clause 1, further comprising: a coupling detector communicatively connected to the switch within the communication device and configured to detect an external near field energy coupler outside the communication device.

Clause 3. The communication device of clause 2, wherein the coupling detector is further configured to inform the switch of coupled communication capabilities between the near field energy coupler and the external near field energy coupler outside the communication device.

Clause 4. The communication device of clause 1, wherein the switch connects communication between the wireless communication controller and the near field energy coupler to enable coupled communication capabilities between the near field energy coupler and an external near field energy coupler outside the communication device.

Clause 5. The communication device of clause 1, wherein the switch connects communication between the wireless communication controller and the far field wireless communication antenna to enable radiative communication capabilities between the far field wireless communication antenna and an external far field wireless communication antenna outside the communication device.

Clause 6. The communication device of clause 1, wherein the switch concurrently connects communication between the wireless communication controller and the near field energy coupler and between the wireless communication controller and the far field wireless communication antenna to enable coupled communication capabilities between the near field energy coupler and an external near field energy coupler in another communication device outside the communication device and to enable radiative communication capabilities between the far field wireless communication antenna and an external far field wireless communication antenna in the other communication device outside the communication device.

Clause 7. The communication device of clause 1, further comprising: one or more electromagnetic shielding structures at least partially encompassing the near field energy coupler within the communication device.

Clause 8. The communication device of clause 1, further comprising: one or more device subsystems within the communication device communicatively connected to communicate through the wireless communication controller and the switch with one or both of the near field energy coupler and the far field wireless communication antenna within the communication device.

Clause 9. A method of manufacturing a communication device, the method comprising: connecting a wireless communication controller with a switch; connecting a near field energy coupler to the wireless communication controller through the switch, the near field energy coupler being configured for near field wireless communications; shielding the near field energy coupler with one or more electromagnetic shielding structures at least partially encompassing the near field energy coupler within the communication device; and connecting a far field wireless communication antenna to the wireless communication controller through the switch, the far field wireless communication antenna being configured for wireless communications, wherein the switch is configured to switch communication with the wireless communication controller between the near field energy coupler and the far field wireless communication antenna.

Clause 10. The method of clause 9, further comprising: connecting a coupling detector to the switch within the communication device, the coupling detector being configured to detect an external near field energy coupler outside the communication device and to inform the switch of coupled communication capabilities between the near field energy coupler and the external near field energy coupler outside the communication device.

Clause 11. The method of clause 9, wherein the switch is configured to connect communication between the wireless communication controller and the near field energy coupler to enable coupled communication capabilities between the near field energy coupler and an external near field energy coupler outside the communication device.

Clause 12. The method of clause 9, wherein the switch is configured to connect communication between the wireless communication controller and the far field wireless communication antenna to enable radiative communication capabilities between the far field wireless communication antenna and an external far field wireless communication antenna outside the communication device.

Clause 13. The method of clause 9, wherein the switch is configured to concurrently connect communication between the wireless communication controller and the near field energy coupler and between the wireless communication controller and the far field wireless communication antenna to enable coupled communication capabilities between the near field energy coupler and an external near field energy coupler in another communication device outside the communication device and to enable radiative communication capabilities between the far field wireless communication antenna and an external far field wireless communication antenna in the other communication device outside the communication device.

Clause 14. A method of managing communications with a switchable communication interface for a communication device, the method comprising: providing a wireless communication controller, a switch, a near field energy coupler configured for wireless communications and communicatively connectable to the wireless communication controller, a far field wireless communication antenna configured for wireless communications and communicatively connectable to the wireless communication controller; and switching, by the switch, communication with the wireless communication controller between the near field energy coupler and the far field wireless communication antenna.

Clause 15. The method of clause 14, further comprising: detecting an external near field energy coupler outside the communication device using a coupling detector communicatively connected to the switch within the communication device.

Clause 16. The method of clause 15, further comprising: informing the switch of coupled communication capabilities detected by the coupling detector between the near field energy coupler and the external near field energy coupler outside the communication device.

Clause 17. The method of clause 14 wherein the switching comprising: connecting communication between the wireless communication controller and the near field energy coupler to enable coupled communication capabilities between the near field energy coupler and an external near field energy coupler outside the communication device.

Clause 18. The method of clause 14, wherein the switching comprising: connecting communication between the wireless communication controller and the far field wireless communication antenna to enable radiative communication capabilities between the far field wireless communication antenna and an external far field wireless communication antenna outside the communication device.

Clause 19. The method of clause 14, wherein the switching comprising: concurrently connecting communication between the wireless communication controller and the near field energy coupler and between the wireless communication controller and the far field wireless communication antenna to enable coupled communication capabilities between the near field energy coupler and an external near field energy coupler in another communication device outside the communication device and to enable radiative communication capabilities between the far field wireless communication antenna and an external far field wireless communication antenna in the other communication device outside the communication device.

Clause 20. The method of clause 14, further comprising: shielding the near field energy coupler with one or more electromagnetic shielding structures at least partially encompassing the near field energy coupler within the communication device.

Clause 21. A system for manufacturing a communication device, the system comprising: means for connecting a wireless communication controller with a switch; means for connecting a near field energy coupler to the wireless communication controller through the switch, the near field energy coupler being configured for near field wireless communications; means for shielding the near field energy coupler with one or more electromagnetic shielding structures at least partially encompassing the near field energy coupler within the communication device; and means for connecting a far field wireless communication antenna to the wireless communication controller through the switch, the far field wireless communication antenna being configured for wireless communications, wherein the switch is configured to switch communication with the wireless communication controller between the near field energy coupler and the far field wireless communication antenna.

Clause 22. The system of clause 21, further comprising: means for connecting a coupling detector to the switch within the communication device, the coupling detector being configured to detect an external near field energy coupler outside the communication device and to inform the switch of coupled communication capabilities between the near field energy coupler and the external near field energy coupler outside the communication device.

Clause 23. The system of clause 21, wherein the switch is configured to connect communication between the wireless communication controller and the near field energy coupler to enable coupled communication capabilities between the near field energy coupler and an external near field energy coupler outside the communication device.

Clause 24. The system of clause 21, wherein the switch is configured to connect communication between the wireless communication controller and the far field wireless communication antenna to enable radiative communication capabilities between the far field wireless communication antenna and an external far field wireless communication antenna outside the communication device.

Clause 25. The method of clause 21, wherein the switch is configured to concurrently connect communication between the wireless communication controller and the near field energy coupler and between the wireless communication controller and the far field wireless communication antenna to enable coupled communication capabilities between the near field energy coupler and an external near field energy coupler in another communication device outside the communication device and to enable radiative communication capabilities between the far field wireless communication antenna and an external far field wireless communication antenna in the other communication device outside the communication device.

Clause 26. A system for managing communications with a switchable communication interface for a communication device, the system comprising: means for providing a wireless communication controller, a switch, a near field energy coupler configured for wireless communications and communicatively connectable to the wireless communication controller, a far field wireless communication antenna configured for wireless communications and communicatively connectable to the wireless communication controller; and means for switching, by the switch, communication with the wireless communication controller between the near field energy coupler and the far field wireless communication antenna.

Clause 27. The system of clause 26, further comprising: means for detecting an external near field energy coupler outside the communication device using a coupling detector communicatively connected to the switch within the communication device.

Clause 28. The system of clause 27, further comprising: means for informing the switch of coupled communication capabilities detected by the coupling detector between the near field energy coupler and the external near field energy coupler outside the communication device.

Clause 29. The system of clause 26 wherein the means for switching comprises: means for connecting communication between the wireless communication controller and the near field energy coupler to enable coupled communication capabilities between the near field energy coupler and an external near field energy coupler outside the communication device.

Clause 30. The system of clause 26, wherein the means for switching comprises: means for connecting communication between the wireless communication controller and the far field wireless communication antenna to enable radiative communication capabilities between the far field wireless communication antenna and an external far field wireless communication antenna outside the communication device.

Clause 31. The system of clause 26, wherein the means for switching comprises: means for concurrently connecting communication between the wireless communication controller and the near field energy coupler and between the wireless communication controller and the far field wireless communication antenna to enable coupled communication capabilities between the near field energy coupler and an external near field energy coupler in another communication device outside the communication device and to enable radiative communication capabilities between the far field wireless communication antenna and an external far field wireless communication antenna in the other communication device outside the communication device.

Clause 32. The system of clause 26, further comprising: means for shielding the near field energy coupler with one or more electromagnetic shielding structures at least partially encompassing the near field energy coupler within the communication device.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A communication device comprising:
a wireless communication controller;
a switch;
a near field energy coupler configured for wireless communications and communicatively connectable to the wireless communication controller through the switch;
a far field wireless communication antenna configured for wireless communications and communicatively connectable to the wireless communication controller through the switch, wherein the switch is configured to switch communication with the wireless communication controller between the near field energy coupler and the far field wireless communication antenna; and
a coupling detector communicatively connected to the switch within the communication device and configured to detect an external near field energy coupler outside the communication device, wherein the coupling detector is further configured to inform the switch of coupled communication capabilities between the near field energy coupler and the external near field energy coupler outside the communication device.

2. The communication device of claim 1, wherein the switch connects communication between the wireless communication controller and the near field energy coupler to enable coupled communication capabilities between the near field energy coupler and an external near field energy coupler outside the communication device.

3. The communication device of claim 1, wherein the switch connects communication between the wireless communication controller and the far field wireless communication antenna to enable radiative communication capabilities between the far field wireless communication antenna and an external far field wireless communication antenna outside the communication device.

4. The communication device of claim 1, wherein the switch concurrently connects communication between the wireless communication controller and the near field energy coupler and between the wireless communication controller and the far field wireless communication antenna to enable coupled communication capabilities between the near field energy coupler and an external near field energy coupler in another communication device outside the communication device and to enable radiative communication capabilities between the far field wireless communication antenna and an external far field wireless communication antenna in the other communication device outside the communication device.

5. The communication device of claim 1, further comprising:
one or more electromagnetic shielding structures at least partially encompassing the near field energy coupler within the communication device.

6. The communication device of claim 1, further comprising:
one or more device subsystems within the communication device communicatively connected to communicate through the wireless communication controller and the switch with one or both of the near field energy coupler and the far field wireless communication antenna within the communication device.

7. A method of manufacturing a communication device, the method comprising:

connecting a wireless communication controller with a switch;

connecting a near field energy coupler to the wireless communication controller through the switch, the near field energy coupler being configured for near field wireless communications;

shielding the near field energy coupler with one or more electromagnetic shielding structures at least partially encompassing the near field energy coupler within the communication device;

connecting a coupling detector to the switch within the communication device, the coupling detector being configured to detect an external near field energy coupler outside the communication device and to inform the switch of coupled communication capabilities between the near field energy coupler and the external near field energy coupler outside the communication device; and connecting a far field wireless communication antenna to the wireless communication controller through the switch, the far field wireless communication antenna being configured for wireless communications, wherein the switch is configured to switch communication with the wireless communication controller between the near field energy coupler and the far field wireless communication antenna.

8. The method of claim 7, wherein the switch is configured to connect communication between the wireless communication controller and the near field energy coupler to enable coupled communication capabilities between the near field energy coupler and an external near field energy coupler outside the communication device.

9. The method of claim 7, wherein the switch is configured to connect communication between the wireless communication controller and the far field wireless communication antenna to enable radiative communication capabilities between the far field wireless communication antenna and an external far field wireless communication antenna outside the communication device.

10. The method of claim 7, wherein the switch is configured to concurrently connect communication between the wireless communication controller and the near field energy coupler and between the wireless communication controller and the far field wireless communication antenna to enable coupled communication capabilities between the near field energy coupler and an external near field energy coupler in another communication device outside the communication device and to enable radiative communication capabilities between the far field wireless communication antenna and an external far field wireless communication antenna in the other communication device outside the communication device.

11. A method of managing communications with a switchable communication interface for a communication device, the method comprising:

providing a wireless communication controller, a switch, a near field energy coupler configured for wireless communications and communicatively connectable to the wireless communication controller, a far field wireless communication antenna configured for wireless communications and communicatively connectable to the wireless communication controller;

detecting an external near field energy coupler outside the communication device using a coupling detector communicatively connected to the switch within the communication device;

informing the switch of coupled communication capabilities detected by the coupling detector between the near field energy coupler and the external near field energy coupler outside the communication device; and switching, by the switch, communication with the wireless communication controller between the near field energy coupler and the far field wireless communication antenna.

12. The method of claim 11 wherein the switching comprises:

connecting communication between the wireless communication controller and the near field energy coupler to enable coupled communication capabilities between the near field energy coupler and an external near field energy coupler outside the communication device.

13. The method of claim 11, wherein the switching comprises:

connecting communication between the wireless communication controller and the far field wireless communication antenna to enable radiative communication capabilities between the far field wireless communication antenna and an external far field wireless communication antenna outside the communication device.

14. The method of claim 11, wherein the switching comprises:

concurrently connecting communication between the wireless communication controller and the near field energy coupler and between the wireless communication controller and the far field wireless communication antenna to enable coupled communication capabilities between the near field energy coupler and an external near field energy coupler in another communication device outside the communication device and to enable radiative communication capabilities between the far field wireless communication antenna and an external far field wireless communication antenna in the other communication device outside the communication device.

15. The method of claim 11, further comprising:

shielding the near field energy coupler with one or more electromagnetic shielding structures at least partially encompassing the near field energy coupler within the communication device.

* * * * *